United States Patent [19]

Bakkelunn

[11] Patent Number: 4,743,417
[45] Date of Patent: May 10, 1988

[54] METHOD FOR THE MANUFACTURE OF PRODUCT COMPRISING FOAMED PLASTIC MATERIAL AND USING A LOW-PRESSURE CHAMBER

[75] Inventor: Terje Bakkelunn, Norrköping, Sweden

[73] Assignee: Rovac Technology, Inc., Kinna, Sweden

[21] Appl. No.: 734,947
[22] PCT Filed: Aug. 31, 1984
[86] PCT No.: PCT/SE84/00287
   § 371 Date: May 13, 1985
   § 102(e) Date: May 13, 1985
[87] PCT Pub. No.: WO85/01238
   PCT Pub. Date: Mar. 28, 1985

[30] Foreign Application Priority Data

Sep. 12, 1983 [SE] Sweden ................................. 8304872

[51] Int. Cl.⁴ .................... B29C 67/22; B29C 39/12; C08J 9/04
[52] U.S. Cl. .................... 264/45.1; 264/45.3; 264/50; 264/53; 264/54; 264/101; 264/DIG. 5; 428/306.6; 521/51; 521/78; 521/138; 521/182
[58] Field of Search .................... 264/45.3, 45.1, 53, 264/54, DIG. 5, 50, 101, DIG. 83, 46.5, 328.6

[56] References Cited

U.S. PATENT DOCUMENTS

| | | | |
|---|---|---|---|
| 3,657,036 | 4/1972 | Mullenhoff et al. | 264/46.2 X |
| 3,970,732 | 7/1976 | Slaats et al. | 264/101 X |
| 4,030,953 | 6/1977 | Rutschow et al. | 264/101 X |
| 4,082,882 | 4/1978 | Weinstein et al. | 264/101 X |
| 4,119,583 | 10/1978 | Filip et al. | 264/46.5 X |
| 4,201,823 | 5/1980 | Russell | 264/101 X |
| 4,238,176 | 12/1980 | Cottrell, Jr. et al. | 264/101 X |
| 4,349,495 | 9/1982 | Mühle | 264/45.1 X |
| 4,351,911 | 9/1982 | Fox | 264/DIG. 83 |
| 4,404,261 | 9/1983 | Canning et al. | 264/101 X |
| 4,405,538 | 9/1983 | Saidla | 264/54 X |
| 4,405,681 | 9/1983 | McEvoy | 264/46.4 X |
| 4,444,832 | 4/1984 | Mazzola et al. | 264/328.6 X |
| 4,464,320 | 8/1984 | Saidla | 264/54 X |
| 4,551,390 | 11/1985 | Canning et al. | 264/101 X |

FOREIGN PATENT DOCUMENTS

| | | |
|---|---|---|
| 2413198 | 7/1979 | France . |
| 2458381 | 2/1981 | France . |
| 135308 | 12/1980 | Norway . |
| 416118 | 1/1980 | Sweden . |
| 2013209 | 8/1979 | United Kingdom . |

*Primary Examiner*—Philip Anderson
*Attorney, Agent, or Firm*—Pollock, Vande Sande & Priddy

[57] ABSTRACT

A propellant is mixed with unsaturated polyester inside a first space (A) at a first pressure, for example at the atmospheric pressure. The polyester is then sprayed on the whole or parts of an open or exposed mould which is applied in a low-pressure chamber having a powerful negative pressure of 60–95% vacuum. In order to spray a first layer, polyester having a first amount of propellant is sprayed on the mould. At the initiation the propellant causes a powerful foaming effect at which bubbles are created and/or expanded in the polyester. In order to spray a second layer, which can be applied before or after the first layer, polyester having a second amount of propellant, or is without propellant, is sprayed on the mould, which causes fewer bubbles or no bubbles at all. The resulting polyester which comprises formed and expanded bubbles is bound (is allowed to tack rigid shape/is polymerized) by the use of a short tack-free time in the low pressure, said short time being preferably 5–10 minutes.

18 Claims, 2 Drawing Sheets

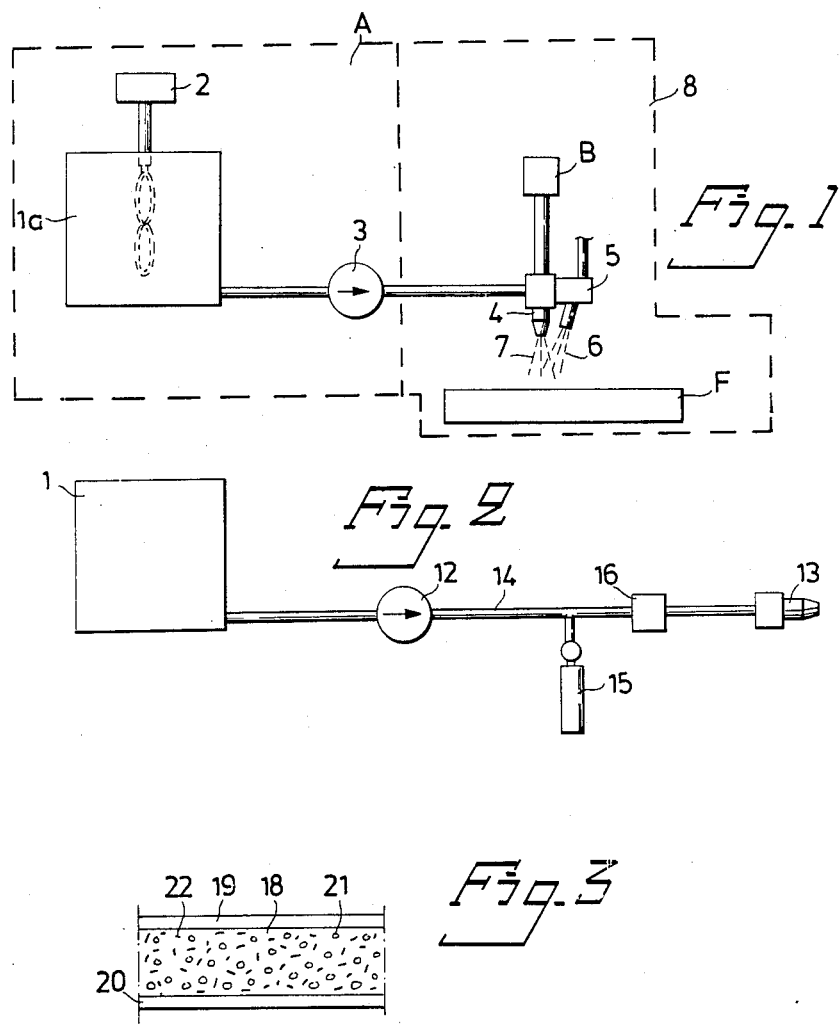

METHOD FOR THE MANUFACTURE OF PRODUCT COMPRISING FOAMED PLASTIC MATERIAL AND USING A LOW-PRESSURE CHAMBER

TECHNICAL FIELD

The present invention relates to a method for the manufacture of a product comprising foamed plastic material in first and second layers. The second layer is connected to the first layer and has a higher density than the first layer.

PRIOR ART

It is usual in the manufacture of foamed plastic products to utilize some form of foaming agent which is dissolved in the base material or is added to it immediately before the foaming process is to commence. As an example of a chemical foaming agent sulphonyl hydrazides may be mentioned. The foaming process can also be brought about by the use of physical agents in the form of a volatile gas such as a chlorofluorocarbon as represented by the FREONS, for example, FREON 11, which is dissolved in (that is to say, forms part of a single-phase system with) the base material. A familiar example of the last-mentioned method is provided by the manufacture of rigid polyurethane foam. The use of carbon dioxide as a foaming agent has also been disclosed.

Activation of the foaming agent in question, for example by means of catalysts, heat and/or a vacuum, will cause the agent to generate gas, resulting in the formation of bubbles which are apparent in the finished product. The familiar methods used until now for the manufacture of foamed plastic products nevertheless call for the use of a comparatively large quantity of foaming agent of up to 10 percent by weight or more. The use of such a large quantity of foaming additives will result in various manufacturing problems such as, for example, problems associated with curing and storage which, when viewed as a whole, complicate the manufacturing process and impair the product. Furthermore, the choice of base materials and the range of possible variations in the production conditions such as, for example, the variations in temperature, are restricted to a certain extent, which has a negative effect on the result.

DESCRIPTION OF THE INVENTION

Technical Problem

A goal which is associated with foamed plastic products is for manufacturing processes to be available which provide the conditions necessary for a major reduction to be achieved in the quantity of the foaming additives used. Said additives have tendencies to disturb the curing processes and cause cracks. Demands on durable and cheap products are available as well.

Further goals are to be able to allot, if necessary, the different layers of the product different thicknesses by a simple control procedure and to be able to provide the product with exactly positioned reinforcements, if necessary.

The present invention proposes a method for the manufacture of a product having a foamed plastic material which will resolve, among other matters, the problem outlined above on the basis of the usage of unsaturated polyester and the discovery that considerably increased foaming effect can be achieved from the use of a foaming agent at a high degree of low pressure, with a vacuum of 60–95% (0.05–0.4 bar) being envisaged in this case. The essential characteristics of the new method are, among other factors, that inside a first zone, which is at a first pressure, the aforementioned foaming agent is mixed with or dissolved in a curing agent-compatible unsaturated polyester. A second feature of the invention comprises the usage of a second zone in the form of a negative pressure chamber which is at that high degree of negative pressure of 60–95% (0.05–0.4 bar) vacuum. The last mentioned pressure is quite below the first pressure. Said chamber contains an open or exposed mold on which the mixture of foaming agent and polyester is sprayed. In order to attain the first layer, polyester mixed with a first amount of foaming agent is sprayed on the whole or parts of the mode under said low pressure. The foaming effect is initiated by means of a curing agent, initiators, and/or said negative pressures, and the foaming agent causes a powerful foaming effect in which bubbles are created and/or expanded in the sprayed polyester. In order to form the second layer, polyester having a second amount of foaming agent or no foaming agent is sprayed on the whole or parts of the mold. Then fewer bubbles than in the case with the first amount, or no bubbles, are created and/or expanded in the second polyester layer. Said first layer is sprayed on the mold either before or after said second layer. Said created and/or expanded bubbles, in at least the first layer, are bound in the polyester by allowing the first layer to take a rigid shape to be polymerized under low pressure for a short time, for example, 30 seconds–20 minutes, preferably 2–10 minutes.

In an embodiment it is proposed that carbon dioxide be used as the foaming agent. Furthermore, the core material in certain embodiments is reinforced with carbon fibres or glass fibres. The core material can be provided in a preferred sandwich construction with a covering layer of higher density on each side of the foamed core. Designs having several layers of foamed, less foamed or non-foamed polyester are simple to manufacture (control) according to the invention.

In a further development of the invention, it is proposed that measures shall be adopted in order to prevent te situation arising in this context in which an excessively rapid rate of ascent is achieved by the gas bubbles produced at the first pressure. Accordingly, the base material must, for example, be essentially free from wetting agents. Also, the use of small bubbles is preferable in order to reduce the rate of ascent. The material selected will preferably be a thixotropic polyester having a viscosity at high shear rates of preferably 140–300 mPa·s. The use of a curing agent system providing a short curing time is also recommended. Bubbles are able to be created in the polyester in the first zone. Said bubbles are expanded under the low-pressure, together with newly created bubbles, if any, under the low pressure.

It is preferable to utilize for the formation and the expansion of the gas bubbles a low-pressure chamber capable of operating at a vacuum of 60–95% (0.05–0.4 bar) and preferably 70–90% (0.1 to 0.3 bar). A chamber of this type can include a suitable space for the product and can be equipped with, amongst other things, openable and closable hatches and, if appropriate, material application elements and air evacuation equipment, etc. The gas bubbles are formed either from gas, for example carbon dioxide, dissolved in the material, or by causing gas to be driven off in conjunction with the disassociation of a chemical foaming agent. The different layers can be sprayed one wet layer onto another wet layer or with certain time intervals between spraying layers where the preceding layer takes a more or less right shape before the application of the next layer.

ADVANTAGES

By means of the invention it is possible to obtain a product having a foamed layer which comprises a significantly reduced amount of chemical foaming additives or physical foaming agents dissolved in the base material. It is worth mentioning in this respect that it is possible, by the use of a 85-90% vacuum (0.1 to 0.15 bar), to reduce the quantity of propellant to ⅓ of that encountered in commercially available foamed products of an equivalent kind. In this way, products which exhibit high mechanical characteristics can be obtained at low cost, and the working environment can be designed to a high standard. The density and/or the reinforcement of the finished product is easily controlled by the equipment which is used. The curing of the product may be made more simple and more distinct, thereby providing the necessary conditions for high-quality products. Each second layer can be made reinforced and not foamed. Only certain parts of the mold can be provided with foamed polyester while other parts can be provided with second layers, which easily can be made for attaining reinforced portions. The use of polyester provides conditions for stronger products, and the new method solves the problems of the low gel temperature of polyester. Low bubble pressure is attained which presents the possibility of a crack-free curing process.

FIGURES

Preferred embodiments of a method for the manufacture of two-layer products is described below by means of four examples, with simultaneous reference to the accompanying drawings, in which:

FIG. 1 illustrates the principle behind the manufacture of core material in accordance with the first example;

FIG. 2 illustrates the principle behind the manufacture of core material in accordance with the second example; and FIG. 3 illustrates a sandwich construction;

THE BEST EMBODIMENT

Example 1 (FIG. 1)

Figure 4:
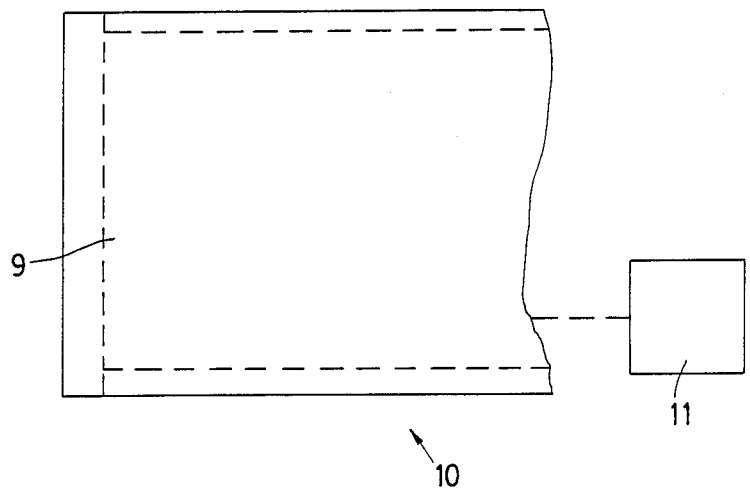
FIG. 4 illustrates apparatus for use with a modified process.

In a container 1a is placed unsaturated polyester (suitable for a spraying operation), for example, laminating polyester of the type used in the small boat industry. The polyester is thixotropic and exhibits a viscosity at high shear rates of, for example, 150 mpa·s. The polyester should preferably be at least essentially free from the wetting agents which are otherwise normally used to facilitate the admixture of the filler. The unsaturated polyester should preferably be modified by known methods so that rapid binding can be achieved after the addition of the curing agents, for example, peroxides. The curing time or the gel time should preferably be selected within the range 30 seconds-20 minutes, and preferably 2-10 minutes. The curing time can be adjusted in a previously disclosed fashion by means of accelerators, inhibitors and curing agents.

A slowly-rotating agitator 2, for example, an agitator rotating at a speed of about 15-50 r/min., is utilized for stirring in conjunction with the admixture of a chemical foaming agent for example sulphonyl hydrazide or a physical propellant which may be in the form of FREON 11. The quantity of a chemical propellant is about 0.2-1.0, and preferably about 0.5 percent by weight of the total mixture of polyester and foaming agent. (Under normal circumstances using a previously disclosed method 3-5 percent by weight of the same propellant would be needed.) The corresponding values in the case of physical foaming agents are about 0.05-0.5 percent, and preferably about 0.1 percent by weight of the total mixture of polyester and foaming agent. The admixture of the foaming agent is carried out in a first zone A at a first pressure which essentially corresponds to atmospheric pressure or may be higher than atmospheric if a pressurized chamber is provided. After the admixture of the foaming agent the material is pumped by means of a pump 3 to a material application device 4, for example, a spray gun of a previously known type. A similarly previously known cutter 5, for example, a fibre glass cutter, may be mounted on the spray gun. With the help of the cutter, chopped fibres 6 are introduced into the jet of polyester 7 which is directed towards an open or exposed mold F. Curing agents, for example, peroxides, for the polyester are added from a container B and are mixed in the spray gun 4 with the polyester in a previously known fashion. The curing agent may alternatively be mixed with the jet outside the spray gun.

In the case of non-reinforced products, the cutter is not activated or may be omitted.

Spraying the polyester on the mold takes place in a second zone 8. The chamber is provided with material application (spray) elements and, if appropriate, with cutter equipment corresponding to those illustrated. Said application elements can be adapted on a robot (not shown) which is automatically controlled. The application can be made on the whole or parts of the mold and with different thicknesses, distribution, etc., of polyester, reinforcements, etc.

Alternatively, referring to FIG. 4, the entire process, that is to say, including the agitation operation, may take place inside the chamber 10, the space 9 of which in that case is kept at the first pressure during agitation and during the addition of the propellant. The curing agent may be added during the agitation operation, during addition to the mold and/or after the chamber has been evacuated by means 11 so as to provide a low pressure, e.g., 0.05 to 0.4 bar.

The chamber, independent of actuation of the air evacuation equipment, will, in this case, be of the previously disclosed kind which is able to produce a high degree of low pressure at 60-95% (0.05-0.4 bar), and preferably 70-90% (0.1 to 0.3 bar) vacuum. In the event of a chemical foaming agent being used, the agent is activated to give off gas, preferably by means of the curing agent. The low pressure permits a higher degree of expansion of the gas bubbles to take place than is possible at atmospheric pressure. In the event of a physical propellant being used, this is activated by the low pressure, which also permits a lower density to be achieved in the finished foam than is possible at atmospheric pressure for an identical quantity of propellant. The short curing time or gel time of 30 seconds-20 minutes, and preferably of 2-10 minutes for the material results in the formed and expanded bubbles being bound in the material in a rapid and effective manner. The application of the plastics material and the curing agent may take place at low pressure. The admixture for the foaming agent always takes place essentially at atmospheric pressure or a pressure above (for example 40-60 bar according to below) the same. The curing of the core material takes place at low pressure.

Products of at least two layers can be made. The first layer is foamed and the second layer is less foamed than the first layer or has a higher density. The choice of porosity is controlled by means of the amount of propellant, the negative pressure and the polyester type. The layers are applied preferably one wet layer on another wet layer.

In the event of reinforcement of the product being required, this can be achieved with relatively very good characteristics. For the first layer, the following is valid. The admixture of, for example, 30 percent weight of chopped fibres (glass fibres) at a density of about 800 kg/m$^3$ (which must be compared with a density of about 1500 kg/m$^3$ for non-foamed products) will result in a bending strength of about 22 mPa, a modulus of elasticity on bending of about 1000 mPa, and a compressive strength of about 14 mPa. The finished material may also be used for sandwich constructions having two or more layers. It may be mentioned from a purely general point of view that the degree of reinforcement of the first layer can be selected within a range of 10-40 percent by weight, and preferably 20-30 percent by weight.

Example 2 (FIG. 2)

A propellant gas other than FREON 11, for example carbon dioxide, may be used and is applied at a pressure such that the carbon dioxide will be dissolved either in full or in part in the polyester or equivalent substance. The polyester may be of the same quality as above. In this case, the polyester is pumped by means of a pump 16 from the container 1 to a material application element, for example a spray gun 13. A source 15 of carbon dioxide (a cylinder) and a mixing apparatus 16 (a so-called static mixer) which mixes the carbon dioxide into the polyester are so arranged in the pipe 14 between the pump and the spray gun as to be capable of being connected. The source 15 operates preferably at about 40-60 bar. From the spray gun 13 the material is applied on the exposed mold at the negative pressure according to above, e.g., in the aforementioned low-pressure chamber. The addition of the curing agent and of any reinforcement which may be required can take place either at the first pressure or at the high degree of low pressure produced by the chamber and which is of the order of magnitude indicated above. The curing time will be short.

FIG. 3 illustrates examples of a sandwich construction in which the core is identified by the reference designation 18, the covering layer by 19 and 20, and the expanded bubbles of the core material by 21. The fibre reinforcement is identified by the reference designation 22. The porosity is controlled by the amount of applied carbon dioxide.

Example 3

Polyester and a chemical foaming agent are mixed together inside a container in accordance with the above by means of a slowly-rotating agitator and at atmospheric pressure. The resulting mixture is applied on a mold together with a curing agent, for example an organic peroxide and, if necessary, glass fibres, at a low pressure of 70-90% (0.1 to 0.3 bar), for example. Considering the first layer, 0.5 percent by weight of foaming agent at about 85% (0.15 bar) of vacuum will produce a similar foaming effect to that produced by 2 percent by weight of foaming agent at atmospheric pressure in both cases, not including reinforcement.

The following components may be used: polyester in the form A360/246A supplied by BP Chemicals; foaming agent in the form of Cellogen XP-100 supplied by Uniroyal Chemicals; peroxide in the form of Butanox M-50 supplied by AKZO Chemicals. The amount of peroxide used should be 2 percent by weight. For each second layer the propellant is reduced or omitted.

The achievement for the first layer, apart from a reduced consumption of the propellant, is more reliable curing and a lower temperature during curing, resulting in less of a tendency to crack formation, and in more even curing, etc. The negative pressure results in lower bubble pressure in the curing procedure.

EXAMPLE 4

Polyester and a chemical foaming agent are mixed together and are applied with reinforcement, if necessary, in a form in accordance with Example 3. The polyester in this case is in the form of Leguval SF 38 supplied by Bayer AG. The foaming agent is LE supplied by Bayer AG, and the peroxide (2 percent by weight) is Butanox M-50 supplied by AKZO Chemicals. Although the formula for LE has not been published by Bayer AG, LE is well-known as a foaming agent. Tests for the first layer have shown that the use of 2 percent by weight of the foaming agent at atmospheric pressure will provide a density of 1.1 g/cm$^3$ at 2 percent by weight and at 90% vacuum (0.10 bar) the density became 0.4 g/cm$^3$, that is to say a lower density can be achieved, or else a considerably reduced consumption of foaming agent can be achieved for a given density.

In the case of Examples 3 and 4 the admixture of fillers of a previously disclosed kind is permissible in order to provide, for example, fire-resistance, a cheaper finished product, and the suppression of high temperatures during curing, etc. The use of glass fibre reinforcement has no significant effect on foaming. The invention is not restricted to the embodiments illustrated above by way of example, but may undergo modifications within the context of the following claims and the concept of the invention.

I claim:

1. A method for manufacturing a plastic article comprising at least two foamed layers which have different densities comprising:
   (a) mixing together in a first zone an unsaturated polyester and a foaming agent, said foaming agent being present in a first concentration and said first zone being maintained at a first pressure;
   (b) providing a curing agent for said unsaturated polyester in the mixture of unsaturated polyester and foaming agent to provide a first sprayable mixture;
   (c) spraying said first sprayable mixture into a second zone and onto the outer surface of an open mold which is within said second zone, and said second zone being maintained at a second pressure which is less than said first pressure in said first zone to form, on said mold, a first plastic layer having a first density;

(d) forming and spraying into said second zone and onto said first plastic layer formed in step (c), a second sprayable mixture of unsaturated polyester and foaming agent which had been mixed together in said first zone together with a curing agent for said unsaturated polyester, said second sprayable mixture containing said foaming agent in a second concentration sufficiently different from the concentration of foaming agent in said first sprayable mixture to produce a second layer of plastic bonded to said first layer, said second layer having a density which is different from the density of said first layer.

2. A method in accordance with claim 1 wherein said first pressure in said first zone is at least atmospheric pressure and said second pressure in said second zone is from about 0.05 bar to about 0.4 bar.

3. A method in accordance with claim 1 wherein said first pressure in said first zone is about atmospheric pressure and said second pressure in said second zone is from about 0.10 bar to about 0.3 bar.

4. A method in accordance with claim 1 wherein said first pressure in said first zone is about atmospheric and said second pressure in said second zone is from about 0.10 bar to about 0.15 bar.

5. A method in accordance with claim 1 wherein said curing agent is provided in a concentration to result in a curing time of from about 30 seconds to about 20 minutes.

6. A method in accordance with claim 1 wherein said curing agent is provided in a concentration to result in a curing time of from about 2 minutes to about 10 minutes.

7. A method in accordance with claim 1 wherein foaming agent produces gases as a result of a chemical reaction and said foaming agent is present in at least one of said spraying mixtures in a concentration from about 0.2 to about 1.0 percent.

8. A method in accordance with claim 1 wherein said foaming agent is a physical agent and is present in at least one of said spraying mixtures in a concentration from about 0.05 to about 0.5 percent.

9. A method in accordance with claim 1 wherein the concentration of foaming agents in said first and second sprayable mixtures are controlled to produce a first plastic layer which has a higher density than the density of said second plastic layer.

10. A method in accordance with claim 1 wherein the concentrations of foaming agent in said first and second sprayable mixtures are controlled to produce a first plastic layer which has a lower density than the density of said second plastic layer.

11. A method in accordance with claim 1 wherein the second sprayable mixture is sprayed onto said first plastic layer while said first plastic layer is wet.

12. A method in accordance with claim 1 wherein reinforcing fibers are added to the sprayable mixture as it is being sprayed into the mold.

13. A method in accordance with claim 1 wherein reinforcing fibers selected from chopped glass fibers and chopped carbon fibers in a concentration of about 10 to about 40 percent by weight are added to the sprayable mixture as it is being sprayed into the mold.

14. A method in accordance with claim 1 wherein said curing agent is introduced into said mixture of said unsaturated polyester and said foaming agent under said first pressure.

15. A method in accordance with claim 1 wherein said curing agent is introduced into said mixture of said unsaturated polyester and said foaming agent under said second pressure.

16. A method in accordance with claim 1 wherein said curing agent is a peroxide.

17. A method in accordance with claim 1 wherein the quantity of foaming agent is selected to produce a density in the range of 170–600 $Kg/m^3$ for at least one of said layers.

18. A method for manufacturing a plastic article comprising at least three layers comprising:

(a) mixing together in a first zone an unsaturated polyester and a foaming agent, said foaming agent being present in a first concentration and said first zone being maintained at a a pressure of at least about 1 atmosphere;

(b) providing a curing agent for said unsaturated polyester in the mixture of unsaturated polyester and foaming agent to provide a first sprayable mixture;

(c) spraying said first sprayable mixture into a second zone and onto the outer surface of an open mold which is within said second zone, said second zone being maintained at a second pressure from about 0.05 bar to about 0.4 bar to form, in said mold, a first plastic layer;

(d) forming and spraying into said second zone and onto said first plastic layer formed in step (c), a second sprayable mixture of unsaturated polyester and foaming agent which had been mixed together in said first zone together with a curing agent for said unsaturated polyester, said second sprayable mixture containing said foaming agent in a concentration sufficiently higher than the concentration of foaming gent in said first sprayable mixture to produce a second layer of plastic bonded to said first layer, said second layer having a density which is lower than the density of said first layer; and (e) repeating steps (a) and (b) and spraying the resulting sprayable mixture on the low density plastic formed in step (d), thereby forming a plastic structure having a low density core.

* * * * *